US012155108B2

(12) United States Patent
Uemichi

(10) Patent No.: US 12,155,108 B2
(45) Date of Patent: Nov. 26, 2024

(54) POWER SPLITTER-COMBINER

(71) Applicant: Fujikura Ltd., Tokyo (JP)

(72) Inventor: Yusuke Uemichi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 374 days.

(21) Appl. No.: 17/628,001

(22) PCT Filed: May 31, 2021

(86) PCT No.: PCT/JP2021/020596
§ 371 (c)(1),
(2) Date: Jan. 18, 2022

(87) PCT Pub. No.: WO2022/254480
PCT Pub. Date: Dec. 8, 2022

(65) Prior Publication Data

US 2024/0030574 A1 Jan. 25, 2024

(51) Int. Cl.
*H01P 1/213* (2006.01)
*H01P 3/08* (2006.01)
*H01P 5/18* (2006.01)

(52) U.S. Cl.
CPC .............. *H01P 1/213* (2013.01); *H01P 5/184* (2013.01); *H01P 3/08* (2013.01)

(58) Field of Classification Search
CPC .. H01P 1/213; H01P 5/184; H01P 3/08; H01P 5/19
See application file for complete search history.

(56) References Cited

U.S. PATENT DOCUMENTS 4,725,792 A 2/1988 Lampe, Jr.
5,150,084 A * 9/1992 Asa .......................... H01P 5/16 333/204
5,467,063 A 11/1995 Burns et al.
6,489,859 B1 * 12/2002 Tahara ..................... H01P 5/16 333/120

FOREIGN PATENT DOCUMENTS

JP H05-037212 A 2/1993
JP 3209086 B2 9/2001
JP 2002-271131 A 9/2002
(Continued)

OTHER PUBLICATIONS

International Search Report dated Jul. 27, 2021, issued in counterpart International Application No. PCT/JP2021/020596. (4 pages).
(Continued)

*Primary Examiner* — Andrea Lindgren Baltzell
*Assistant Examiner* — Kimberly E Glenn
(74) *Attorney, Agent, or Firm* — WHDA, LLP

(57) ABSTRACT

The power splitter-combiner (1) includes one combining terminal (11), two split terminals (12*a*, 12*b*), an absorption resistance (13) connected between the two split terminals, a first transmission line (14*a*) connected between the combining terminal and one split terminal of the two split terminals, a second transmission line (14*b*) connected between the combining terminal and the other split terminal of the two split terminals and having a length shorter than that of the first transmission line, and at least one first open stub (15) connected to the second transmission line.

12 Claims, 6 Drawing Sheets

(56) References Cited

FOREIGN PATENT DOCUMENTS

| | | | |
|---|---|---|---|
| JP | 2007-123972 | A | 5/2007 |
| KR | 10-2008-0027054 | A | 3/2008 |
| KR | 10-1870385 | B1 | 6/2018 |

OTHER PUBLICATIONS

Wang et al., "A Planar Three-Way Dual-Band Power Divider Using Two Generalized Open Stub Wilkinson Dividers", Proceedings of Asia-Pacific Microwave Conference 2010, Mar. 10, 2011, pp. 714-717. (4 pages).

Wang et al., "A Compact and Harmonic Suppression Wilkinson Power Divider with General π Type Structure", 2015 IEEE MTT-S International Microwave Symposium, Jul. 27, 2015. (4 pages).

Wang et al., "Dual-band Wilkinson power divider and its miniaturization using coupled line sections", Microwave Conference Proceedings (APMC), 2012, pp. 1256-1258. (3 pages).

Kang et al., "An unequal Wilkinson power divider with a high dividing ratio", Microwave Conference (EUMC), 2012, pp. 1127-1129. (3 pages).

* cited by examiner

POWER SPLITTER-COMBINER

TECHNICAL FIELD

The present invention relates to a power splitter-combiner.

BACKGROUND ART

Recently, radio communication module carrying out radio communication using high-frequency signals such as a micro wave, a millimeter wave, or the like are actively developed. In such radio communication module, a power splitter-combiner carrying out power splitting or power combining of high-frequency signals is used. For the above-described power splitter-combiners, Wilkinson-type power splitter-combiner is known as a typical power splitter-combiner. The Wilkinson-type power splitter-combiner includes one combining terminal, two split terminals, an absorption resistance connected between the split terminals, a quarter-wave line (90-degree line) connected between the combining terminal and one of the split terminals, and a quarter-wave line connected between the combining terminal and the other of the split terminals.

The following Patent Document 1 discloses an example of a multistage Wilkinson-type power splitter-combiner including Wilkinson-type power splitter-combiners which are connected to each other by connection wirings so as to form an N-stage (N is an integer greater than or equal to two) tournament structure. In such multistage Wilkinson-type power splitter-combiner, one combining terminal, $2^N$ split terminals, and $(2^N-1)$ Wilkinson-type power splitter-combiners are provided.

PRIOR ART DOCUMENTS

Patent Documents

[Patent Document 1] Japanese Patent No. 3209086

SUMMARY OF THE INVENTION

Problems to be Solved by the Invention

However, each of Wilkinson-type power splitter-combiners which constitutes the multistage Wilkinson-type power splitter-combiner disclosed by the aforementioned Patent Document 1 is configured to include a quarter-wave line that is disposed symmetrically with respect to a straight line passing through one combining terminal and the midpoint of the two split terminals. In addition, a plurality of Wilkinson-type power splitter-combiners are connected using connection wiring so as to form a tournament structure. Consequently, the multistage Wilkinson-type power splitter-combiner has a problem in that an exclusive area (footprint) becomes large (the size thereof is large). Furthermore, in the multistage Wilkinson-type power splitter-combiner disclosed by the aforementioned Patent Document 1, since the Wilkinson-type power splitter-combiners are connected by connection wiring, there is a problem in that the loss amount (loss) increases due to provision of the connection wiring.

The invention was conceived in view of the above-described circumstances and has an object thereof to provide a power splitter-combiner that is smaller in size than ever before and capable of decreasing the loss thereof.

Means for Solving the Problems

A power splitter-combiner (1 to 3) according to an aspect of the invention includes one combining terminal (11), two split terminals (12*a*, 12*b*), an absorption resistance (13) connected between the two split terminals, a first transmission line (14*a*) connected between the combining terminal and one split terminal of the two split terminals, a second transmission line (14*b*) connected between the combining terminal and the other split terminal of the two split terminals and having a length shorter than that of the first transmission line, and at least one first open stub (15) connected to the second transmission line.

In the power splitter-combiner according to the aforementioned aspect, the absorption resistance is connected between the two split terminals, the first transmission line is connected between the combining terminal and one split terminal of the two split terminals, the second transmission line is connected between the combining terminal and the other split terminal of the two split terminals. The second transmission line has a length shorter than that of the first transmission line, and on the other hand at least one first open stub is connected to the second transmission line.

As described above, in the power splitter-combiner according to the aspect, since the length of the second transmission line can be shorter than the length of the first transmission line, it is possible to increase the degree of flexibility in layout. Accordingly, for example, in the case in which the power splitter-combiner has a multistage connection structure, the position of the combining terminal of the power splitter-combiner located at a first stage that is optionally selected from the plurality of the stages can be disposed at the position corresponding to the split terminal of the power splitter-combiner located at a second stage next to the first stage. Therefore, a conventional connection using connection wiring is not necessary, a power splitter-combiner that is smaller in size than ever before is achieved and it is possible to reduce the loss thereof. Furthermore, since the length of the second transmission line is compensated by the first open stub connected to the second transmission line, the characteristics of the power splitter-combiner can be close to the ideal characteristics (the characteristics in the case in which the lengths of the first transmission line and the second transmission line are the same as each other). Here "a first stage that is optionally selected from the plurality of the stages" is not limited to the initial first stage of the multistage connection structure of the power splitter-combiner. Second or third stage of the multistage connection structure of the power splitter-combiner may correspond to "first stage".

In the power splitter-combiner according to the above-mentioned aspect, the second transmission line may have a characteristic impedance higher than that of the first transmission line.

In the power splitter-combiner according to the above-mentioned aspect, the first open stub may be connected to a central portion of the second transmission line.

In the power splitter-combiner according to the above-mentioned aspect, a plurality of the first open stubs may be connected to the second transmission line so as to split the second transmission line into equal portions.

In the power splitter-combiner according to the above-mentioned aspect, the first transmission line may have an electrical length that is a length corresponding to a quarter-wave of a predetermined center frequency.

The power splitter-combiner according to the above-mentioned aspect may further include at least one second open stub (16) that is connected to the first transmission line.

In the power splitter-combiner according to the above-mentioned aspect, the second open stub may have a length shorter than the length of the first open stub.

In the power splitter-combiner according to the above-mentioned aspect, the first transmission line may have an electrical length that is shorter than a length corresponding to a quarter-wave of a predetermined center frequency.

In the power splitter-combiner according to the above-mentioned aspect, the first transmission line and the second transmission line may extend so as to be parallel to each other and may be bended in a same direction as each other.

Effects of the Invention

According to the aspect of the invention, it is possible to provide a power splitter-combiner that is smaller in size than ever before and capable of decreasing the loss thereof.

EMBODIMENTS FOR CARRYING OUT THE INVENTION

Figure 1:
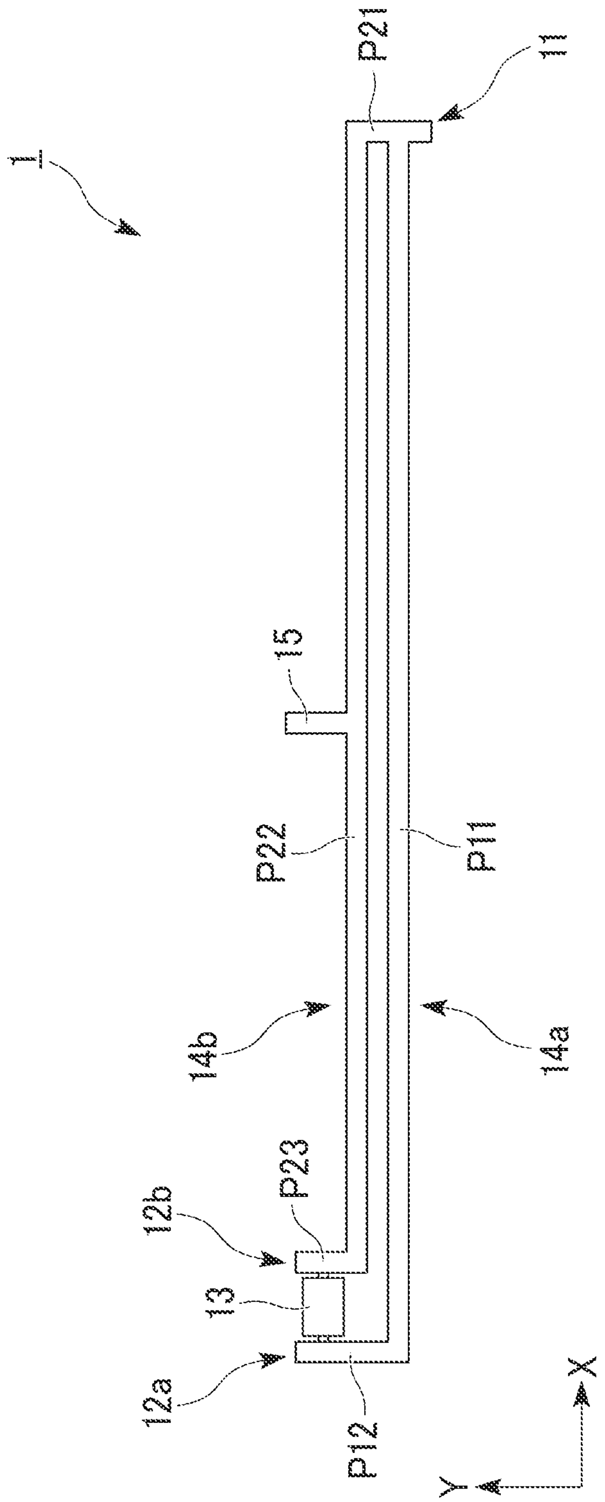
FIG. 1 is a plan view showing a configuration of a relevant part of a power splitter-combiner according to an embodiment.

Hereinafter, a power splitter-combiner according to an embodiment of the invention will be particularly described with reference to the drawings. Note that, in the following explanation, for ease in understanding, a positional relationship between various components will be described with reference to an XY orthogonal coordinate system set in the drawings as necessary. Furthermore, in the drawings referred below, for ease in understanding, the components are shown while modifying the dimensions thereof as needed.

FIG. 1 is a plan view showing a configuration of a relevant part of a power splitter-combiner according to the embodiment. As shown in FIG. 1, a power splitter-combiner 1 according to the embodiment includes a combining terminal 11, split terminals 12*a* and 12*b*, an absorption resistance 13, a transmission line 14*a* (first transmission line), a transmission line 14*b* (second transmission line), and an open stub 15 (first open stub). Note that, the power splitter-combiner 1 is formed on a substrate (plate-shaped dielectric substrate).

The power splitter-combiner 1 power-splits a high-frequency signal which is input from the combining terminal 11, outputs the split high-frequency signals from the split terminals 12*a* and 12*b*, power-combines the high-frequency signals which are input from the split terminals 12*a* and 12*b*, and outputs the combined high-frequency signal from the combining terminal 11. That is, the power splitter-combiner 1 has a configuration capable of functioning as a power splitter of a high-frequency signal and also functioning as a power combining unit of a high-frequency signal. Note that, the power splitter-combiner 1 has the configuration similar to a Wilkinson-type power splitter-combiner. The high-frequency signal that is input to and output from the power splitter-combiner 1 may be, for example, a signal having a micro-wave band (frequency of approximately 300 (MHz) to 30 [GHz]) or may be a signal having a millimeter-wave band (frequency of approximately 30 to 300 [GHz].

The combining terminal 11 is a terminal to which a high-frequency signal power-split by the power splitter-combiner 1 is input or from which a high-frequency signal power-combined by the power splitter-combiner 1 is output. The split terminals 12*a* and 12*b* are each a terminal from which a high-frequency signal power-split by the power splitter-combiner 1 is output or to which a high-frequency signal power-combined by the power splitter-combiner 1 is input. The combining terminal 11 and the split terminals 12*a* and 12*b* are formed on, for example, a substrate surface. Note that, in the case in which a substrate has a multilayer wiring structure, a layer having the combining terminal 11 and the split terminals 12*a* and 12*b* which are formed therein may be optionally selected.

The absorption resistance 13 is a resistor that obtains isolation between the split terminals 12*a* and 12*b* and is provided on a substrate surface and between the split terminal 12*a* and the split terminal 12*b*. It is preferable that the electrical length of the absorption resistance 13 (the electrical length between the split terminals 12*a* and 12*b*) be boundlessly zero. This is because, when the electrical length of the absorption resistance 13 is long, the phase rotation amount of a retransmission signal via the absorption resistance 13 does not become 180 degrees, and the isolation characteristics between the split terminals 12*a* and 12*b* are degraded. Note that, the aforementioned retransmission signal is a high-frequency signal that is transmitted from the split terminal 12*a* to the split terminal 12*b* via the absorption resistance 13 or a high-frequency signal that is transmitted from the split terminal 12*b* to the split terminal 12*a* via the absorption resistance 13.

The transmission line 14*a* is a line through which the high-frequency signal input to the power splitter-combiner 1 is transmitted, and is connected between the combining terminal 11 and the split terminal 12*a*. The transmission line 14*a* includes a first straight part P11 that extends in the −X direction and a second straight part P12 that continuously extends in the +Y direction from the first straight part P11. The electrical length of the transmission line 14*a* is set to the length corresponding to the quarter-wave of a predetermined center frequency. That is, the transmission line 14*a* is a quarter-wave line (90-degree line). Such transmission line 14*a* is realized by, for example, a microstrip line or a coplanar line.

Similar to the transmission line 14*a*, the transmission line 14*b* is a line through which the high-frequency signal input to the power splitter-combiner 1 is transmitted, and is connected between the combining terminal 11 and the split terminal 12*b*. The transmission line 14*b* includes a first straight part P21 that extends in the +Y direction, a second straight part P22 that extends in the −X direction continuously from the first straight part P21, and a third straight part P23 that extends in the +Y direction continuously from the second straight part P22. The electrical length of the transmission line 14*b* is set to be shorter than the length corresponding to the quarter-wave of a predetermined center frequency. This is because, the power splitter-combiner 1 becomes small in size by setting the transmission line 14*b* so as not to protrude from at the position of the combining terminal 11 in the X direction toward the +X side. Additionally, the transmission line 14*b* has the characteristic impedance higher than that of the transmission line 14*a*. Similar to the transmission line 14*a*, such transmission line 14*b* is realized by, for example, a microstrip line or a coplanar line.

As shown in FIG. 1, the transmission lines 14*a* and 14*b* extend in parallel to each other and are bended in the same direction as each other. Specifically, the transmission lines 14*a* and 14*b* extend from the split terminals 12*a* and 12*b*, respectively, in parallel to each other in the −Y direction, are bended at the middle thereof toward the +X direction, and extend in parallel to each other in the +X direction. Particularly, the transmission lines 14*a* and 14*b* are asymmetrical to each other with respect to the straight line passing through the center of the absorption resistance 13 extending in the Y direction.

With this configuration, the combining terminal 11 can be disposed at the position that is displaced from the straight line passing through the center of the absorption resistance 13 extending in the Y direction, and it is possible to increase the degree of flexibility in layout of the power splitter-combiner 1. Consequently, for example, in the case in which the power splitter-combiner 1 has a multistage connection structure, the position of the combining terminal 11 of the power splitter-combiner 1 located at a first stage that is optionally selected from the plurality of the stages can be disposed at the position corresponding to the split terminal (not shown in the drawings) of the power splitter-combiner located at a second stage next to the first stage. Therefore, a conventional connection using connection wiring is not necessary, and the power splitter-combiner is smaller in size than ever before and it is possible to reduce the loss thereof.

Here, the term “first stage” and the term “second stage” mean the relationship between two stages constituting the multistage connection structure but are not the terms for limiting the initial first stage of the multistage connection structure and the second stage next to the first stage.

For example, in a multistage connection structure having three stages, the second stage of the three stages may correspond to “first stage”, and in the case, the third stage of the three stages corresponds to “second stage”.

Even in the case in which the power splitter-combiner has a multistage connection structure having four stages or more, the above-described relationship is similarly applied thereto. For example, in the case in which the third stage of the four stages corresponds to “first stage”, the fourth stage corresponds to “second stage”; and in the case in which the second stage of the four stages corresponds to “first stage”, the third stage corresponds to “second stage”.

The open stub 15 compensates the electrical length of the transmission line 14*b* in which the electrical length thereof is shorter than the electrical length of the quarter-wave line (90-degree line). Although it is preferable that the open stub 15 be connected at the position at which the length of the transmission line 14*b* is split in half, as long as desired characteristics can be obtained, the open stub 15 may be connected to a position displaced from the position. The open stub 15 may be connected to the central portion of the transmission line 14*b*. The electrical length and the characteristic impedance of the open stub 15 are appropriately set.

Figure 2:
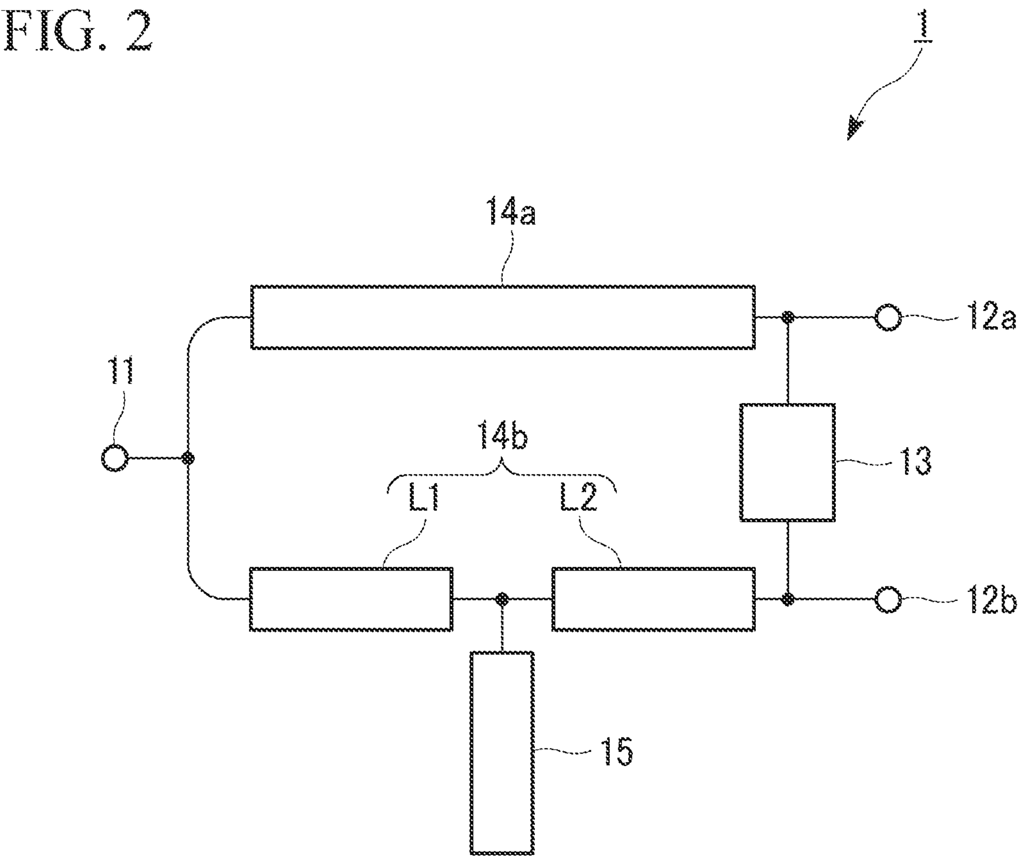
FIG. 2 is a view showing an equivalent circuit of the power splitter-combiner shown in FIG. 1.

FIG. 2 is a view showing an equivalent circuit of the power splitter-combiner shown in FIG. 1. Note that, in FIG. 2, identical reference numerals are used for the elements which correspond to the elements shown in FIG. 1. As shown in FIG. 2, the power splitter-combiner 1 is shown by a circuit in which the absorption resistance 13 is connected between the split terminals 12*a* and 12*b*, the transmission line 14*a* is connected between the combining terminal 11 and the split terminal 12*a*, the transmission line 14*b* is connected between the combining terminal 11 and the split terminal 12*b*, and the open stub 15 is connected to the transmission line 14*b*. Note that, the transmission line 14*b* is shown by two lines L1 and L2 which are connected in series to each other, and the open stub 15 is shown by a line having one end that is connected to the connection point between the lines L1 and L2.

Figure 3:
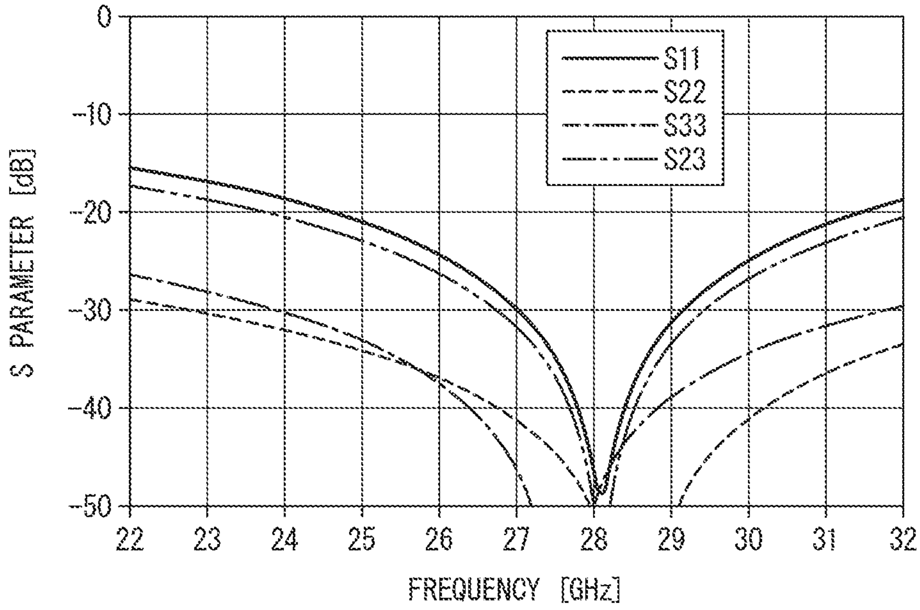
FIG. 3 is a graph showing simulation results in the case of designing the power splitter-combiner shown in FIG. 2 such that the center frequency thereof is 28 [GHz].

FIG. 3 is a graph showing simulation results in the case of designing the power splitter-combiner shown in FIG. 2 such that the center frequency thereof is 28 [GHz]. Note that, the simulation results are obtained in the case in which the circuit parameters of the power splitter-combiner 1 shown in FIG. 2 were set as follows.

Center frequency: 28 [GHz]

Reference impedance of the combining terminal 11: 32[Ω]

Reference impedance of the split terminals 12*a* and 12*b*: 25[Ω]

Resistance value of the absorption resistance 13: 50[Ω]

Electrical length of the transmission line 14*a*: the electrical length of quarter-wave line (90-degree line)

Characteristic impedance of the transmission line 14*a*: 40[Ω]

Electrical length of the transmission line 14*b*: the electrical length of 70-degree line (the electrical length of the lines L1 and L2 is the electrical length of 35-degree line)

Characteristic impedance of the transmission line 14*b*: 56[Ω]

Electrical length of the open stub 15: the electrical length of 26.4-degree line Characteristic impedance of the open stub 15: 40[Ω]

Figure 4A:
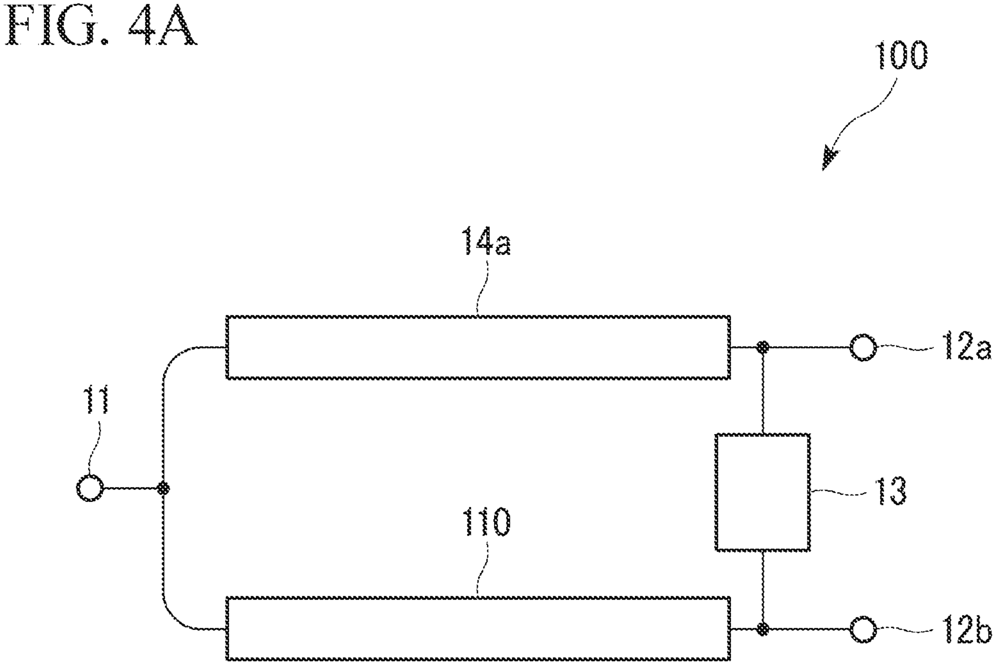
FIG. 4A is a view showing an equivalent circuit of a power splitter-combiner for comparison.
Figure 4B:
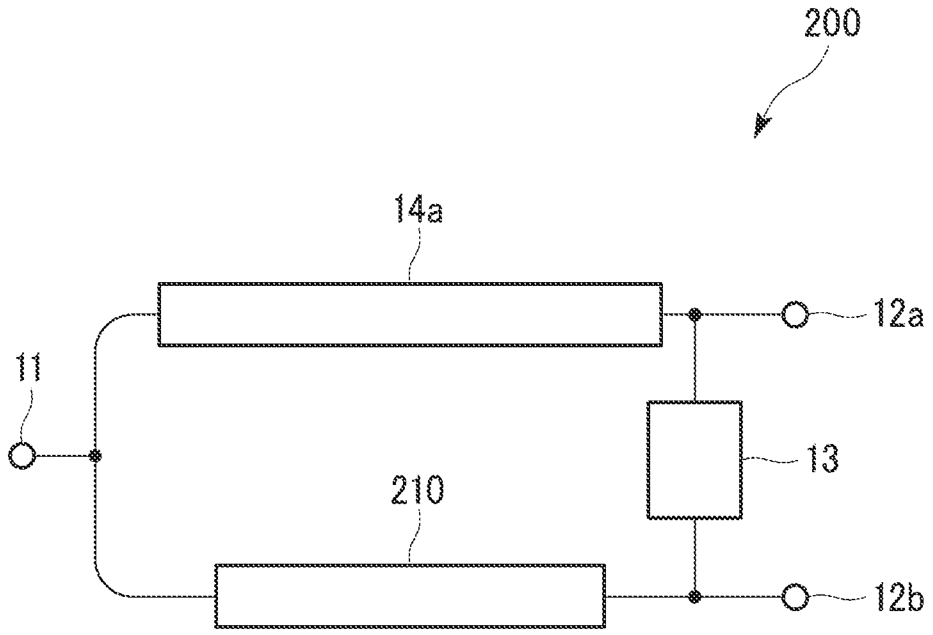
FIG. 4B is a view showing an equivalent circuit of a power splitter-combiner for comparison.

Here, the simulation results shown in FIG. 3 will be discussed in comparison with the simulation results of another power splitter-combiner. FIGS. 4A and 4B are views each showing an equivalent circuit of a power splitter-combiner for comparison. Note that, in FIGS. 4A and 4B, identical reference numerals are used for the elements which correspond to the elements shown in FIG. 2.

The power splitter-combiner 100 shown in FIG. 4A has a configuration in which a transmission line 110 is provided instead of the transmission line 14*b* and the open stub 15 of the power splitter-combiner 1 shown in FIG. 2. The circuit parameters of the transmission line 110 are as follows.

Electrical length of the transmission line 110: the electrical length of quarter-wave line (90-degree line)

Characteristic impedance of the transmission line 110: 40[Ω]

That is, the power splitter-combiner 100 shown in FIG. 4A has a configuration in which the transmission line 110 having the same electrical characteristics as those of the transmission line 14*a* is provided between the combining terminal 11 and the split terminal 12*b*. Note that, the other circuit parameters of the transmission line 110 are the same as the circuit parameters of the power splitter-combiner 1 shown in FIG. 2.

A power splitter-combiner 200 shown in FIG. 4B has a configuration in which the open stub 15 is omitted from the power splitter-combiner 1 shown in FIG. 2. Note that, a transmission line 210 shown in FIG. 4B is the same as the transmission line 14*b* shown in FIG. 2.

Note that, in other words, the power splitter-combiner 200 shown in FIG. 4B has a configuration in which the electrical length of the transmission line 110 of the power splitter-combiner 100 shown in FIG. 4A is simply shortened.

Figure 5A:
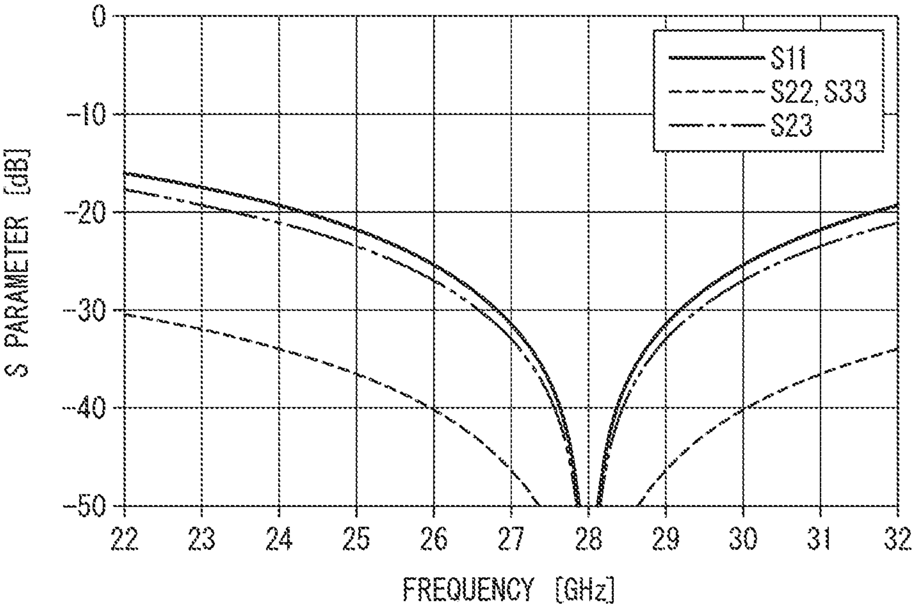
FIG. 5A is a graph showing simulation results of the power splitter-combiner shown in FIG. 4A.
Figure 5B:
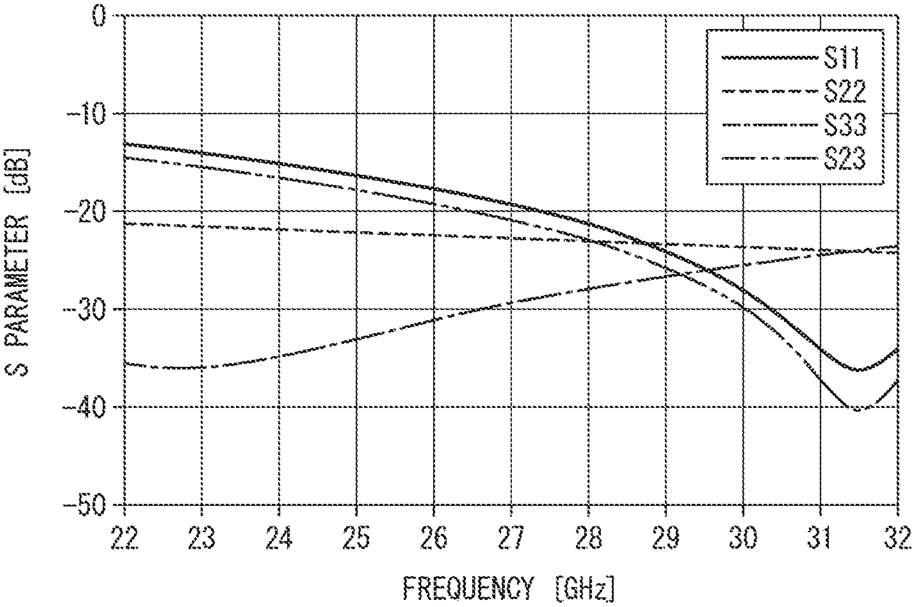
FIG. 5B is a graph showing simulation results of the power splitter-combiner shown in FIG. 4B.

FIG. 5A is a graph showing simulation results of the power splitter-combiner shown in FIG. 4A, and FIG. 5B is a graph showing simulation results of the power splitter-combiner shown in FIG. 4B. Note that, in the simulation results shown in FIGS. 3, 5A, and 5B, reference numeral S11 represents the reflection characteristics of the combining terminal 11, reference numeral S22 represents the reflection characteristics of the split terminal 12*a,* reference numeral S33 represents the reflection characteristics of the split terminal 12*b,* and reference numeral S23 represents the isolation characteristics between the split terminals 12*a* and 12*b*.

Firstly, with reference to FIG. 5A, it is apparent that the reflection characteristics of the combining terminal 11, the reflection characteristics of the split terminal 12*a,* the reflection characteristics of the split terminal 12*b,* and the isolation characteristics between the split terminals 12*a* and 12*b* are all the minimum at the center frequency (28 [GHz]). This means that, in the power splitter-combiner 100 shown in FIG. 4A, the high-frequency signal having the center frequency which is input to the combining terminal 11 or the high-frequency signal having the center frequency which is input to the split terminals 12*a* and 12*b* is not reflected (alternatively, hardly reflected). Additionally, this means that, in the power splitter-combiner 100 shown in FIG. 4A, the high-frequency signal having the center frequency is not transmitted (alternatively, hardly transmitted) from the split terminal 12*a* to the split terminal 12*b* via the absorption resistance 13.

Next, with reference to FIG. 5B, it is apparent that the reflection characteristics of the combining terminal 11, the reflection characteristics of the split terminal 12*a,* the reflection characteristics of the split terminal 12*b,* and the isolation characteristics between the split terminals 12*a* and 12*b* are all significantly different from the results shown in FIG. 5A and are not the minimum at the center frequency (28 [GHz]). This means that, in the power splitter-combiner 200 shown in FIG. 4B, most high-frequency signal having the center frequency which is input to the combining terminal 11 or most high-frequency signal having the center frequency which is input to the split terminals 12*a* and 12*b* is reflected. Furthermore, this means that, in the power splitter-combiner 200 shown in FIG. 4B, most high-frequency signal having the center frequency is transmitted from the split terminal 12*a* to the split terminal 12*b* via the absorption resistance 13.

Next, with reference to FIG. 3, similar to the results shown in FIG. 5A, it is apparent that the reflection characteristics of the combining terminal 11, the reflection characteristics of the split terminal 12*a,* the reflection characteristics of the split terminal 12*b,* and the isolation characteristics between the split terminals 12*a* and 12*b* are all substantially the minimum at the center frequency (28 [GHz]). Accordingly, in the power splitter-combiner 1 shown in FIG. 2, similar to the power splitter-combiner 100 shown in FIG. 4A, the high-frequency signal having the center frequency which is input to the combining terminal 11 or the high-frequency signal having the center frequency which is input to the split terminals 12*a* and 12*b* is not reflected (alternatively, hardly reflected). Moreover, in the power splitter-combiner 1 shown in FIG. 2, similar to the power splitter-combiner 100 shown in FIG. 4A, the high-frequency signal having the center frequency is not transmitted (alternatively, hardly transmitted) from the split terminal 12*a* to the split terminal 12*b* via the absorption resistance 13.

As described above, the power splitter-combiner 1 according to the embodiment includes the absorption resistance 13 connected between the split terminals 12*a* and 12*b*, the transmission line 14*a* connected between the combining terminal 11 and the split terminal 12*a,* and the transmission line 14*b* connected between the combining terminal 11 and the split terminal 12*b.* The transmission line 14*b* has the length shorter than that of the transmission line 14*a* and has the characteristic impedance higher than that of the transmission line 14*a,* and the open stub 15 that adjusts the electrical length of the transmission line 14*b* is connected to the transmission line 14*b*. Therefore, even where the transmission line 14*b* is shorter than the transmission line 14*a,* the characteristics of the power splitter-combiner 1 can be close to the ideal characteristics of the power splitter-combiner 100 shown in FIG. 5A.

In addition, in the power splitter-combiner 1 according to the embodiment, the length of the transmission line 14*b* is set to be shorter than the length of the transmission line 14*a*. Consequently, for example, as shown in FIG. 1, since the transmission line 14*b* can be set so as not to protrude from at the position of the combining terminal 11 in the X direction toward the +X side, the power splitter-combiner 1 can be small in size.

Additionally, in the power splitter-combiner 1 according to the embodiment, the transmission lines 14*a* and 14*b* extend in parallel to each other as shown in FIG. 1 and are bended in the same direction as each other. Particularly, the transmission lines 14*a* and 14*b* are asymmetrical to each other with respect to the straight line passing through the center of the absorption resistance 13 extending in the Y direction. Accordingly, the combining terminal 11 can be disposed at the position that is displaced from the straight line passing through the center of the absorption resistance 13 extending in the Y direction, and it is possible to increase the degree of flexibility in layout of the power splitter-combiner 1.

As a result of increasing the degree of flexibility in layout of the power splitter-combiner 1, for example, in the case in which the power splitter-combiner 1 has a multistage connection structure, the combining terminal 11 of the power splitter-combiner 1 can be disposed at the position of the split terminal (not shown in the drawings) of the power splitter-combiner at the next stage (alternatively, the combining terminal 11 of the power splitter-combiner 1 can be disposed at the position close to the split terminal of the power splitter-combiner at the next stage). Therefore, since a conventionally-required connection wiring is not necessary, it is possible to achieve a multi-stage power splitter-combiner which is smaller in size than ever before and in which the loss thereof is reduced.

As described above, the embodiment was described, the invention is not limited to the aforementioned embodiment and is freely modifiable in the scope of the invention. For example, in the power splitter-combiner 1 described in the embodiment, one open stub 15 is connected to the transmission line 14*b*. However, shown in FIG. 6, a plurality of the open stubs 15 may be connected to the transmission line 14*b*.

Figure 6:
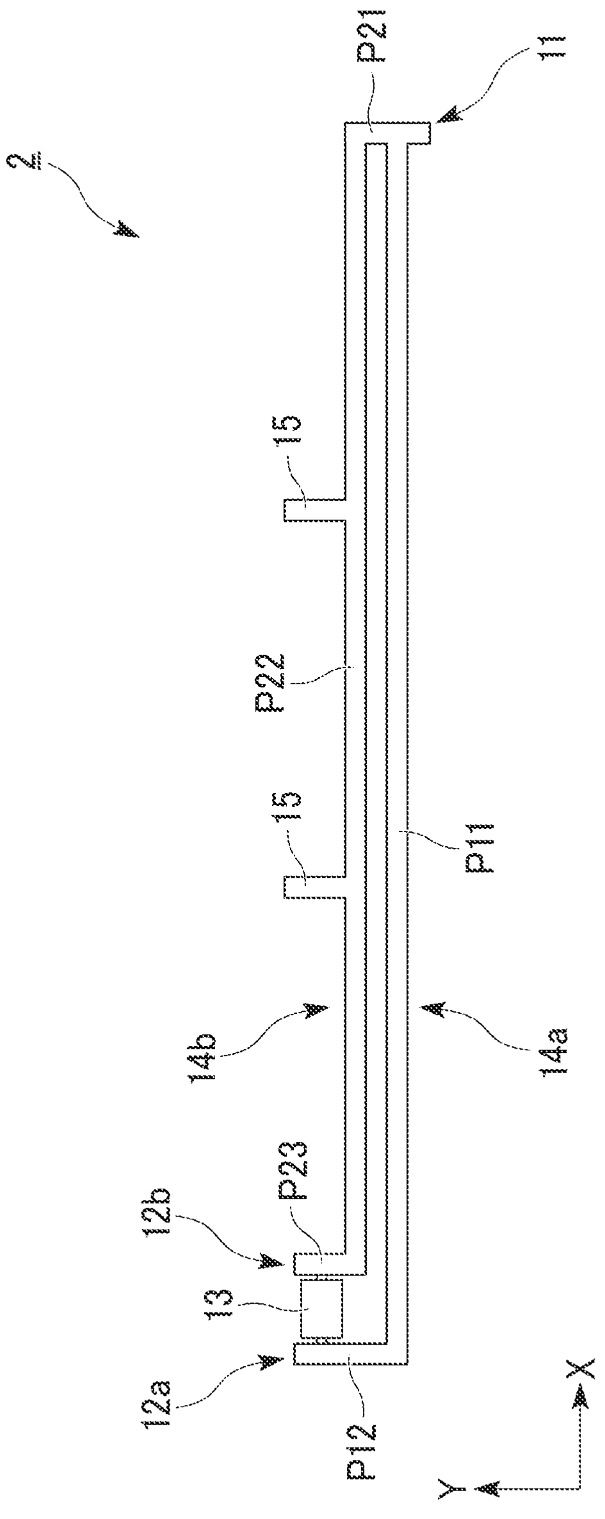
FIG. 6 is a plan view showing a configuration of a relevant part of a power splitter-combiner according to a modified example of the embodiment.

FIG. 6 is a plan view showing a configuration of a relevant part of a power splitter-combiner according to a modified example of the embodiment. In a power splitter-combiner 2 shown in FIG. 6, two open stubs 15 are connected to the transmission line 14*b*. Here, in the case in which a plurality of open stubs 15 are connected to the transmission line 14*b*, it is preferable that the open stub 15 be connected to the transmission line 14*b* so as to split the transmission line 14*b* into equal portions. For example, in the example shown in FIG. 6, the two open stubs 15 are connected to the transmission line 14*b* so as to split the transmission line 14*b* into three equal parts.

Note that, the number of the open stubs 15 is not limited to two but may be three or more. In other words, in the case in which the number of the first open stubs is M (M is an integer greater than or equal to two), the number of regions of the second transmission line is (M+1) due to connection of the M first open stubs and the second transmission line.

Figure 7:
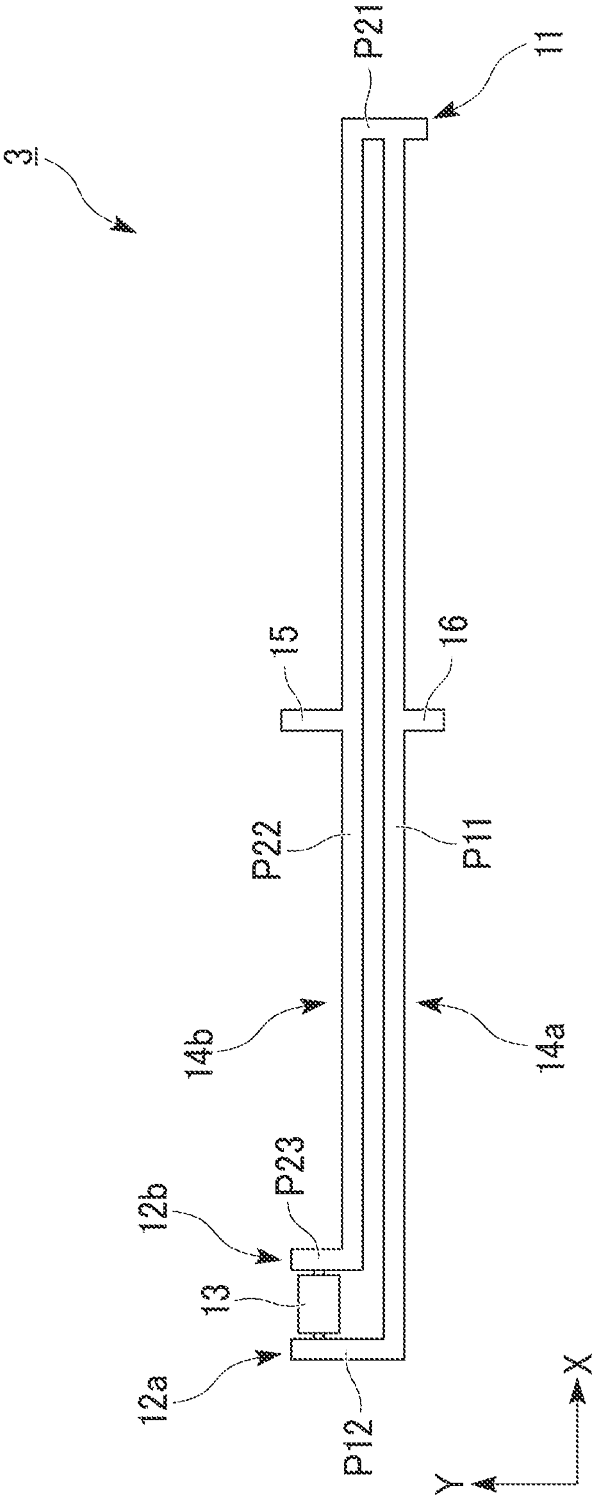
FIG. 7 is a plan view showing a configuration of a relevant part of a power splitter-combiner according to another modified example of the embodiment.

Additionally, in the power splitter-combiner 1 described in the embodiment, the open stub 15 is connected to the transmission line 14*b*. However, as shown in FIG. 7, an open stub 16 (second open stub) may also be connected to the transmission line 14*a*. FIG. 7 is a plan view showing a configuration of a relevant part of a power splitter-combiner according to another modified example of the embodiment. In the power splitter-combiner 3 shown in FIG. 7, one open stub 15 is connected to the transmission line 14*b*, and one open stub 16 is connected to the transmission line 14*a*. Note that, in the Y direction, the length of the open stub 16 is shorter than the length of the open stub 15.

In the power splitter-combiner 3 shown in FIG. 7, for example, in the case in which the electrical lengths of both the transmission lines 14*a* and 14*b* are each shorter than the length corresponding to the quarter-wave of a predetermined center frequency, the open stubs 15 and 16 are connected to the transmission lines 14*b* and 14*a*, respectively. It is preferable that the open stubs 15 and 16 be connected to the central portions of the transmission lines 14*b* and 14*a*, respectively. Note that, the number of the open stubs 15 and 16 may be one or more. In the case in which the open stubs 16 are connected to the transmission line 14*a*, it is preferable that the open stub 16 be connected to the transmission line 14*a* so as to split the transmission line 14*a* into equal portions.

Additionally, in the aforementioned embodiment, for example, the case in which the reference impedance of the combining terminal 11 is different from the reference impedances of the split terminals 12*a* and 12*b* was described. However, the reference impedance of the combining terminal 11 may be the same as the reference impedances of the split terminals 12*a* and 12*b*.

DESCRIPTION OF REFERENCE NUMERALS

1 to 3 . . . power splitter-combiner
11 . . . combining terminal
12*a*, 12*b* . . . split terminal
13 . . . absorption resistance
14*a*, 14*b* . . . transmission line
15, 16 . . . open stub

The invention claimed is:

1. A power splitter-combiner comprising:
one combining terminal;
two split terminals;
an absorption resistance connected between the two split terminals;
a first transmission line that is connected between the combining terminal and one split terminal of the two split terminals;
a second transmission line that is connected between the combining terminal and the other split terminal of the two split terminals and has a length shorter than that of the first transmission line; and
at least one first open stub that is connected to the second transmission line, wherein
the second transmission line has a characteristic impedance higher than that of the first transmission line.

2. The power splitter-combiner according to claim 1, wherein the first open stub is connected to a central portion of the second transmission line.

3. The power splitter-combiner according to claim 2, wherein
the first transmission line has an electrical length that is a length corresponding to a quarter-wave of a predetermined center frequency.

4. The power splitter-combiner according to claim 2, wherein at least one second open stub that is connected to the first transmission line.

5. The power splitter-combiner according to claim 1, wherein
a plurality of the first open stubs are connected to the second transmission line so as to split the second transmission line into equal portions.

6. The power splitter-combiner according to claim 1, wherein
the first transmission line has an electrical length that is a length corresponding to a quarter-wave of a predetermined center frequency.

7. The power splitter-combiner according to claim 1, further comprising:
at least one second open stub that is connected to the first transmission line.

8. The power splitter-combiner according to claim 7, wherein
the second open stub has a length shorter than a length of the first open stub.

9. The power splitter-combiner according to claim 7, wherein
the first transmission line has an electrical length that is shorter than a length corresponding to a quarter-wave of a predetermined center frequency.

10. The power splitter-combiner according to claim 1, wherein
the first transmission line and the second transmission line extend so as to be parallel to each other and are bended in a same direction as each other.

11. A power splitter-combiner comprising:
one combining terminal;
two split terminals;
an absorption resistance connected between the two split terminals;
a first transmission line that is connected between the combining terminal and one split terminal of the two split terminals;
a second transmission line that is connected between the combining terminal and the other split terminal of the two split terminals and has a length shorter than that of the first transmission line; and
at least one first open stub that is connected to the second transmission line,
wherein the first transmission line and the second transmission line extend so as to be parallel to each other and are bended in a same direction as each other.

12. A power splitter-combiner comprising:
one combining terminal;
two split terminals;
an absorption resistance connected between the two split terminals;

a first transmission line that is connected between the combining terminal and one split terminal of the two split terminals;

a second transmission line that is connected between the combining terminal and the other split terminal of the two split terminals and has a length shorter than that of the first transmission line; and at least one first open stub that is connected to the second transmission line, wherein the first transmission line has an electrical length that is a length corresponding to a quarter-wave of a predetermined center frequency.

* * * * *